United States Patent
Vranjes et al.

(10) Patent No.: US 9,535,565 B2
(45) Date of Patent: Jan. 3, 2017

(54) SMART INSERTION OF APPLICATIONS INTO LAYOUTS

(71) Applicant: Microsoft Corporation, Redmond, WA (US)

(72) Inventors: Miron Vranjes, Seattle, WA (US); Jesse Satterfield, Seattle, WA (US); Matthew Worley, Redmond, WA (US); Nils Sundelin, Seattle, WA (US); Tsz Yan Wong, Seattle, WA (US); Bret Anderson, Seattle, WA (US); Robert Jarrett, Seattle, WA (US); Chaitanya Sareen, Seattle, WA (US); Alice Steinglass, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 101 days.

(21) Appl. No.: 13/892,532

(22) Filed: May 13, 2013

(65) Prior Publication Data

US 2014/0337794 A1 Nov. 13, 2014

(51) Int. Cl.
*G06F 3/0481* (2013.01)
*G06F 9/44* (2006.01)

(52) U.S. Cl.
CPC ............ *G06F 3/0481* (2013.01); *G06F 9/4443* (2013.01); *G06F 2203/04803* (2013.01)

(58) Field of Classification Search
None
See application file for complete search history.

(56) References Cited

U.S. PATENT DOCUMENTS 5,487,143 A * 1/1996 Southgate ...................... 715/790
6,008,809 A * 12/1999 Brooks .......................... 715/792
(Continued)

FOREIGN PATENT DOCUMENTS

EP     0820002 A1    1/1998

OTHER PUBLICATIONS

Thurrott, Paul, "Windows Phone 8 Tip: Resize and Arrange Live Tiles", Retrieved at <<http://winsupersite.com/article/windows-phone-8/windows-phone-8-tip-resize-arrange-live-tiles-144689>>, Oct. 29, 2012, pp. 3.

(Continued)

*Primary Examiner* — William Bashore
*Assistant Examiner* — Daniel Parcher
(74) *Attorney, Agent, or Firm* — Bryan Webster; Dan Choi; Micky Minhas

(57) ABSTRACT

Embodiments described herein relate to maintaining a tiled arrangement of application windows as a user inserts application windows into a managed display region. A tiled arrangement is an arrangement where windows do not overlap each other and substantially maximize window occupation of the display region. Generally, when a user inserts an application window the tiled arrangement is maintained by resizing any previously present application windows. Where to insert a window, which displayed windows to resize and to what extent can be determined based on factors such as user input, any prior manual adjustment of the tiled arrangement, and/or minimum window sizes. Whether tile arranging is performed in a managed or curated fashion (e.g., by sharing space equally among windows) or in a semi-curated fashion may be determined by taking into account any of the aforementioned factors.

17 Claims, 10 Drawing Sheets

(56) References Cited

U.S. PATENT DOCUMENTS

| | | | |
|---|---|---|---|
| 2005/0055645 A1* | 3/2005 | Matthews | G06T 3/40 715/800 |
| 2005/0198584 A1 | 9/2005 | Matthews et al. | |
| 2005/0210414 A1* | 9/2005 | Angiulo | G06F 17/3089 715/838 |
| 2006/0082820 A1* | 4/2006 | Anderson | G06Q 20/201 358/1.15 |
| 2011/0026836 A1* | 2/2011 | Ptucha | G06T 11/60 382/209 |
| 2011/0302528 A1* | 12/2011 | Starr | 715/800 |
| 2012/0162266 A1 | 6/2012 | Douglas et al. | |
| 2013/0055055 A1* | 2/2013 | Turcotte et al. | 715/201 |
| 2014/0013271 A1* | 1/2014 | Moore | G06F 3/0482 715/792 |

OTHER PUBLICATIONS

Raja, Haroon Q, "How to Resize, Group & Manage App Tiles in Windows 8 Start Screen", Retrieved at <<http://www.addictivetips.com/windows-tips/how-to-resize-group-manage-app-tiles-in-windows-8-start-screen/>>, Mar. 1, 2012, pp. 8.

"Tiles for Windows Phone", Retrieved at <<http://msdn.microsoft.com/en-us/library/windowsphone/develop/hh202948(v=vs.105).aspx>>, Apr. 8, 2013, pp. 6.

Thurrott, Paul, "Windows 8 Tip: Customize the Start Screen",Retrieved at <<http://winsupersite.com/article/windows8/windows-8-tip-customize-start-screen-144230>>, Sep. 12, 2012, pp. 8.

"How to Resize, Pin or Unpin Metro App Tiles Windows 8", Retrieved at <<http://howtech.tv/basics/how-to-resize-pin-or-unpin-metro-app-tiles-windows-8/>>, Retrieved Date: Apr. 15, 2013, pp. 8.

"How to Use Mac Os X Lion Spaces", Retrieved at <<http://www.wikihow.com/Use-Mac-Os-X-Lion-Spaces/>>, Mar. 1, 2012, pp. 5.

International Search Report, International Application No. PCT/US2013/060752 (filed Sep. 20, 2013), mailed Jan. 29, 2014.

* cited by examiner

SMART INSERTION OF APPLICATIONS INTO LAYOUTS

BACKGROUND

Computer windowing systems have long been in use. Such windowing systems can have many designs, for instance free-form window manipulation by users. Features of such windowing systems are well known and documented elsewhere. Typically, windowing systems have graphic windows for respective processes running on a computer. A user interacts with the windowing system to manipulate and manage the windows. Most windowing systems have functionality to allow applications (assumed to have respective windows) to be opened, closed, moved, hidden, displayed, resized, customized, and so forth.

While various schemes for windowing systems have been used, the increasing size of displays (including projectors and 3D displays) as well as the popularity of tablet computing devices and touch input has renewed interest in tiled windowing systems. In such windowing systems application windows may be manipulated by a user to maximize window sizes while keeping windows from occluding each other, even when application windows are added. In general, tiled windowing systems may benefit from improved techniques for automatically managing the insertion by a user of windows to a display where one or more other windows are already displayed. Such techniques and related approaches are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments described herein relate to maintaining a tiled arrangement of application windows as a user inserts application windows into a managed display region. A tiled arrangement is an arrangement where windows do not overlap each other and substantially maximize window occupation of the display region. Generally, when a user inserts an application window the tiled arrangement is maintained by resizing any previously present application windows. Where to insert a window, which displayed windows to resize and to what extent can be determined based on factors such as user input, any prior manual adjustment of the tiled arrangement, and/or minimum window sizes. Whether tile arranging is performed in a managed or curated fashion (e.g., by sharing space equally among windows) or in a semi-curated fashion may be determined by taking into account any of the aforementioned factors.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments discussed below relate to managing layout and arrangement of windows when a window is interactively added to a display. Tiled windowing systems are discussed first. Interactive window placement is described next, followed by discussion of algorithms for automatically managing interactive window placement or insertion using various signals available at the time of insertion. Example insertion scenarios are also discussed.

Figure 1:
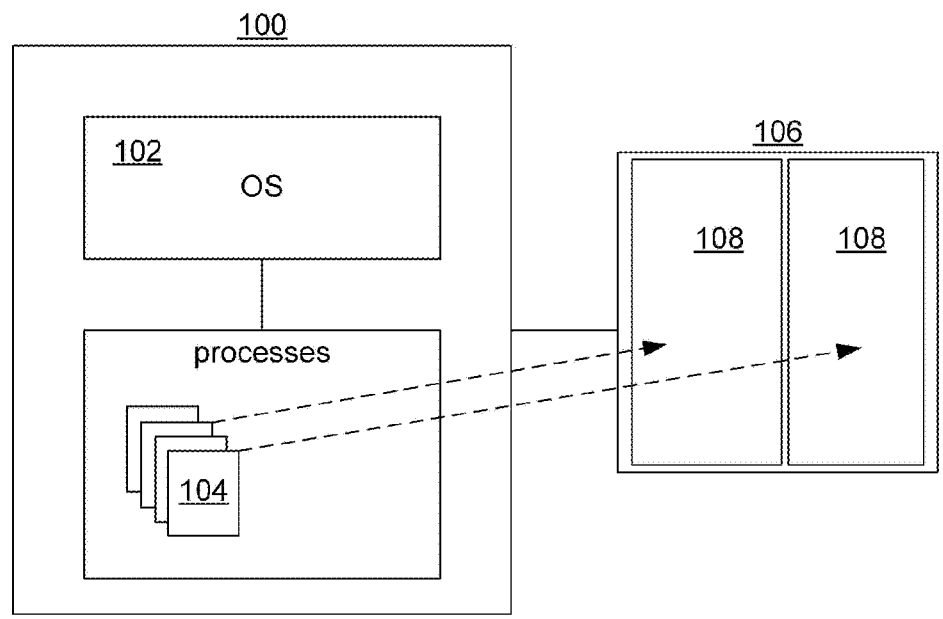
FIG. 1 shows a computing device.

FIG. 1 shows a computing device 100 having an operating system 102 managing application processes 104 and displaying corresponding windows 108 on a display 106. The computing device 100 may be any of a variety of types which are described later with reference to FIG. 10. The computing device 100 may be assumed to have at least storage and a processor for executing the operating system 102 and the application processes 104. Although there may be windowing systems with individual windows that represent multiple processes, and also processes without windows, for ease of discussion application processes 104 are assumed herein to each have at least a corresponding window 108. Processes are well known operating system objects that are discretely managed units of execution, typically having a process identifier, memory managed by the operating system (heap and/or stack memory), and may be managed in a process table of process identifiers or the like that is maintained by the operating system.

The windows 108 may be managed and rendered by a windowing system which may be a part of the operating system 102 or may be closely coupled with operating system 102. The windowing system may itself be a process 104. The windowing system typically responds to user input events and window events, handles the generation and removal of windows 108, resizing windows, moving windows, and many other window-related functions. Techniques described herein may be implemented directly in a windowing system, or in a user interface shell or layer wrapping a windowing system, or a combination thereof. For discussion, implementations in a windowing system are described herein. However, those skilled in the art of computer programming will be able to apply the teachings herein to other implementations and such implementations are contemplated by this description. In short, a "windowing system" is any executing computer component(s) managing windows as described herein.

As mentioned, the windowing system may implement a tiled management scheme where windows are automatically laid out in a tiled arrangement. A tiled arrangement may generally be one in which windows (or perhaps at least active windows) are automatically kept from overlapping or obscuring each other and yet occupation of the display (or a managed region thereof) by windows is maximized such that non-window space is minimized. Such a tiled arrangement may be automatically maintained while accommodating windows being newly displayed or redisplayed, opened, closed, hidden, moved, inserted, resized, etc. For an example of a tiled windowing system see U.S. patent application Ser. No. 13/863,369 filed Apr. 15, 2013. Non-window space may include borders or aesthetic margins, areas for user interface elements such as search tools, shortcuts for functions or particular windows, etc.

Figure 2:
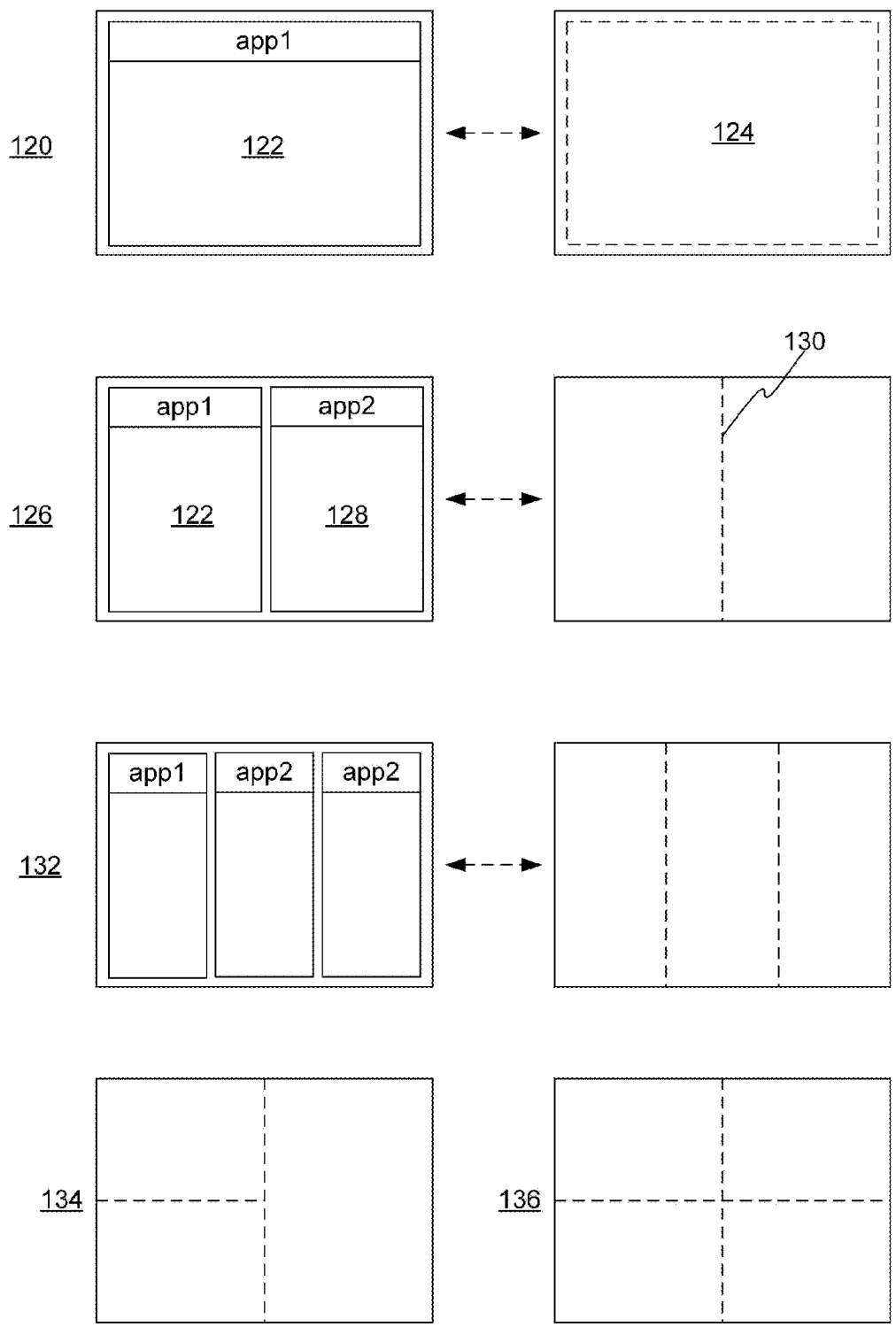
FIG. 2 shows examples of tiled window arrangements.

FIG. 2 shows examples of tiled window arrangements. Starting from the top, example 120 is a single application window 122 displayed in a managed display region 124. Assuming that another application window 128 is added by a user, for example by opening an application, dragging an indicator of an application into the managed display region 124, invoking an application shortcut, etc., then the windowing system or the like manages the layout of the application windows 122, 128 to maximize window occupancy of the display region 124, as shown in example 126. When there are multiple application windows displayed, the windowing system may automatically provide a user-adjustable divider 130 between the application windows. When the divider 130 is interactively moved by the user two or more affected windows are resized accordingly to maintain the tiled arrangement. If another application window is added the tiled arrangement may continue to be maintained by automatically resizing the existing application windows, as shown in example 132. In one embodiment, application windows are tiled into linear slots (e.g., a single vertical column or a single horizontal row), as seen in the previously mentioned examples (grid-style layouts may also be used as discussed below). In addition, as described further below, the windowing system may be pre-configured to transition to different types of arrangements according to conditions such as the number of application windows, the types of windows, user preferences, minimum window sizes, and others. As seen in other examples 134, 136, automatically managed tiled arrangements may have asymmetries and various rectilinear layouts such as a grid layout.

Figure 3:
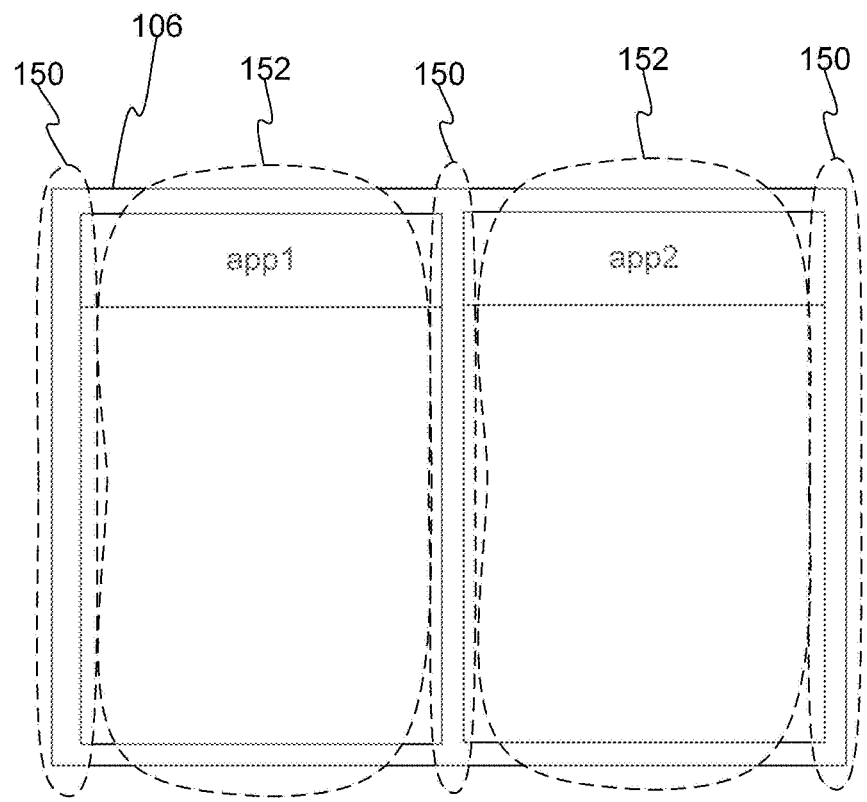
FIG. 3 shows an example of predefined input regions that allow a user to insert or replace application windows.

FIG. 3 shows an example of predefined input regions that allow a user to insert or replace application windows. As mentioned above, a windowing system may allow a user to interactively add an application window to a display (or managed region thereof). The user may control, by various forms of input from an input device, where and how an application window is to be added. In the example of FIG. 3, a windowing system dynamically arranges input-sensitive regions in relation to the number and/or location of application windows being displayed. Such regions may include insertion regions 150 and replacement regions 152. When the user directs input for a to-be-displayed (target) application window to a particular insertion region 150 then the target window is inserted accordingly. Similarly, when a target window is directed to a replacement region 152 a corresponding application window may be replaced (note that any of the insertion techniques described herein may be applied to or used in conjunction with window replacement). If the user directs the target application window to the leftmost insertion region 150 then the target application window will be inserted accordingly; the previously displayed application windows (e.g., "app1" and "app2") may be moved and/or resized to fit both the previously displayed application windows and the target application window.

The regions may be defined in a number of ways. The regions may have predefined default sizes and locations for different numbers of displayed application windows. The regions may be dynamically configured according to factors such as the size of the display, accessibility settings, font size, user preferences derived from past manipulation of dividers, ratios of window size and/or display size, user input such as modifier keys (e.g., left-click vs. right-click), and others. Also, there may be inert regions where user input will neither insert nor replace the target window. User-activatable regions with other functions may also be included.

Any type of input device may be manipulated by a user to direct placement of a target application window (as described elsewhere, alternatively, a user may initiate a window insertion but the insertion location or position can be automatically determined). The input device may be, for example, a touch sensitive surface, a mouse, a digitizer pad, an object-recognizing camera system, and so on. In addition, the input thereof may take a variety of forms. For example, a user may hover an input point over an input-sensitive region, an input-sensitive region may be explicitly designated, a marker or icon may be dragged and dropped in an input-sensitive region, etc. In one embodiment, a representation of the target application is moved on the display by the user and a nearest region may be selected with explicit user input or by the user ending or releasing the movement.

Figure 4:
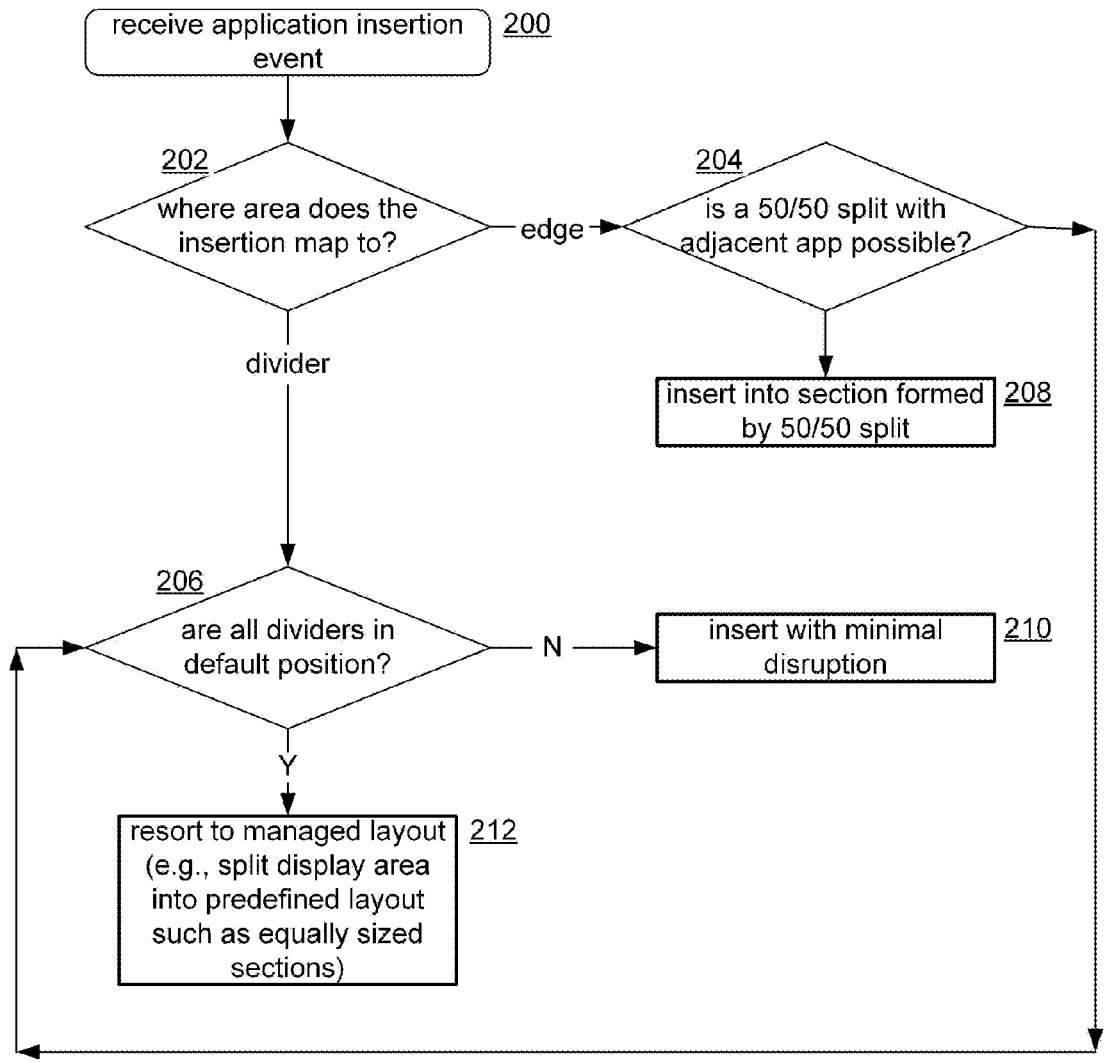
FIG. 4 shows an example of an algorithm for automatically maintaining a tiled window arrangement when an application window is inserted by a user.

FIG. 4 shows an example of an algorithm for automatically maintaining a tiled window arrangement when an application window is inserted by a user. It will be assumed for discussion that the user is providing a stream of two (or more) dimensional input points as by a touch stroke on a surface or a mouse movement, for example. The input points may move, on the display, an input pointer, an application representation (icon, thumbnail, etc.), the target application window itself, or some other graphic object. Graphics or highlights may be displayed to indicate an input-sensitive region (or a destination screen area) that the user is about to select or target. Details for previewing a user's intended insertion are discussed further below. According to the user's input (e.g., when the input points stop being inputted or when the input is modified or another input is provided) a screen location for the target window is designated and step 200 occurs; an application insertion event is received.

Following step 200, at step 202 there is a determination of where the insertion maps on the display or a managed region thereof. If the insertion maps to an edge or an exterior element of the display or managed display region (to be referred to inclusively as "display" for short) then step 204 is performed, otherwise step 206 is performed. Note that an edge can correspond to an exterior input-sensitive insertion region such as the leftmost and rightmost insertion regions 150. If the user's insertion maps to an edge then there is an application window adjacent to the selected edge, and that application window is used in performing step 204. Step 204 determines whether the space occupied by the adjacent application window is large enough to fit the target application window and the adjacent application window with a reduced size. In one embodiment, this space might be required to be large enough to accommodate the new application and divider without disturbing the existing dividers on screen. This may be determined by various means such as by determining if the space occupied by the adjacent application windows is larger than a minimum size of the adjacent application window plus a minimum size of the target application window (plus any addition needed space such as for a new divider or margins). Such minimum sizes can be application-specific settings, default system settings, dynamically computed according to features such the size of the display, and so forth. As used herein, "minimum size" also refers to a size preference, possibly an application attribute, which might or might not be strictly enforced.

When step 204 determines that a split is to be performed, then at step 208 the space occupied by the adjacent application window is split, for instance divided in half, the adjacent application window is resized to fit its half, and the target application window is displayed with a size to fit its half (the half next to the selected edge). Ratios other than 50/50 may be used, for instance to accommodate a minimum size of either application window or application preference, but the split may be limited to splitting the space of only the adjacent application window; any other application windows that are already displayed are not affected.

If it is determined at step 202 that an edge is not selected or a divider or other non-edge or internal element has been designated by the user as an insertion area, then step 206 is performed (in some cases, when step 204 determines that there will be no split, the process may go to step 206). In this case, another test is performed to determine if all dividers are in their default positions. In a general sense, the algorithm checks to see whether the window applications are in a curated or managed mode where window tiling is managed by the system and has not been overridden by the user. If the dividers (or application window screen partitions) are in their default positions then automated or curated management of the tiled layout continues at step 212. The automated or curated layout management may involve using predefined layouts for the number of current application windows, evenly dividing the display into sections for the respective application windows, or other fully managed tiled layouts.

If at step 206 it is determined that the user has overridden the default layout, for instance by checking to see if a divider has been moved, then at step 210 the target application window is inserted with techniques to minimize disruption of the current display layout. In other words, the algorithm attempts to minimize disruption of the layout preference indicated by the user. In one embodiment, the target application window is inserted at a minimal size with minimal automatic rearrangement of dividers to allow fitting the target application. This may also require moving one or more other dividers the least amount possible. Specifically, an implementation may start by targeting the applications that are closest and try to obtain as much space as possible. If an application-minimum is a limiting factor, then the implementation may radiate out to take more space until it has sufficient space for an insertion. If a set of applications in a managed or curated layout (e.g., 50/50, 75/25, 40/30/30) are encountered then space may be taken equally from those applications (rather than one at a time), thus preserving the pre-existing applications' relative size relationships.

The process described above uses various types of signals or indicators to determine how to automatically arrange a tiled layout. The steps and decisions mentioned with reference may be varied in order and in other ways while achieving similar ends. Variations of the process are able to fully manage the insertion of application windows without requiring the user to do anything other than to designate a location to insert the application window. However, if the user has manually configured the current tiled arrangement of application windows then the process may insert windows in a way that avoids or minimizes any change to the layout of relevant application windows. In addition, features of the application windows themselves may be taken into account. For example, minimum size, range of supported sizes, expected or average size, past manual sizings of an application window, or other size-related features may be used.

Note that while interactive placement has been described above, the same space-allocation techniques may be used regardless of how an insertion location has been selected. For example, if an application is automatically launched by a user action, a location for inserting that application can be determined automatically and then that location can be used for insertion.

Figure 5:
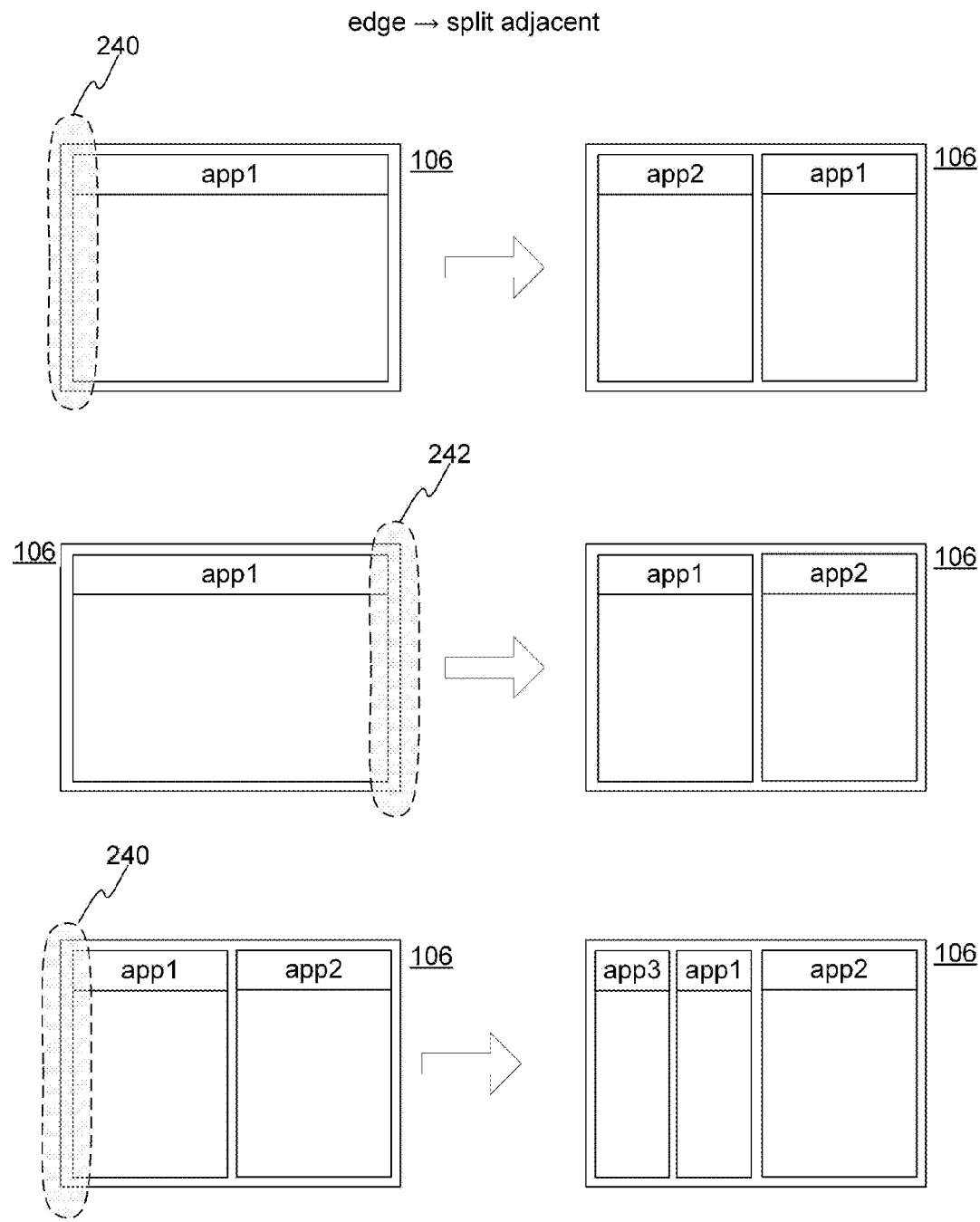
FIG. 5 shows examples of inserting an application window at an edge when an adjacent split is found to be possible.

FIG. 5 shows examples of inserting an application window at an edge when an adjacent split is found to be possible. At the top of FIG. 5 the user has designated left edge 240 as an insertion point and the target application window "app2" has been inserted accordingly with tiled layout computed automatically. The next sequence of FIG. 5 shows selection of right edge 242 and "app2" inserted at the corresponding side of the display 106. The lower sequence of FIG. 5 shows insertion at the left edge 240 when two application windows are present. There is a determination that the space occupied by adjacent "app1" is able to contain both the target application window "app3" and the "app1" window and the space is split 50/50. The "app3" window is inserted next to the selected edge and the adjacent application window of "app1" is resized resulting in the tiled arrangement at the lower right of FIG. 5. In an embodiment where dividers are used, a divider is added between the two application windows of "app3" and "app1".

Figure 6:
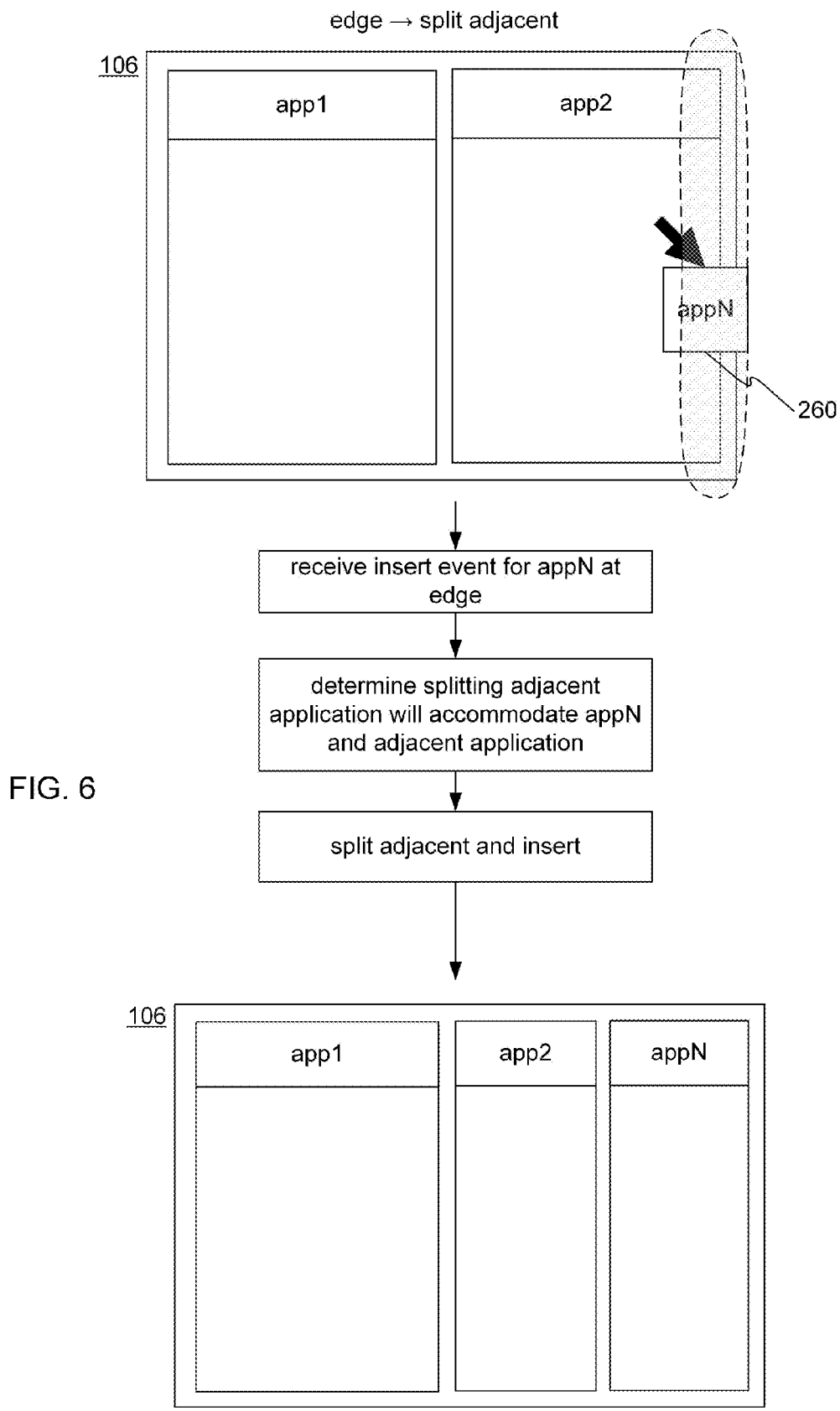
FIG. 6 shows an example where an edge insertion includes an application representation inserted at an edge.

FIG. 6 shows an example where an edge insertion includes an application representation 260 inserted at an edge. The insertion event is received, there is a determination that a split of the adjacent application "app2" is possible, and the application window for "appN" is inserted into the space created by the split. A divider may be added between the application windows for "app2" and "appN". The application representation 260 may move without restraint, may move on a horizontal "rail", or may snap from one insertion or replacement region to another, for example.

Figure 7:
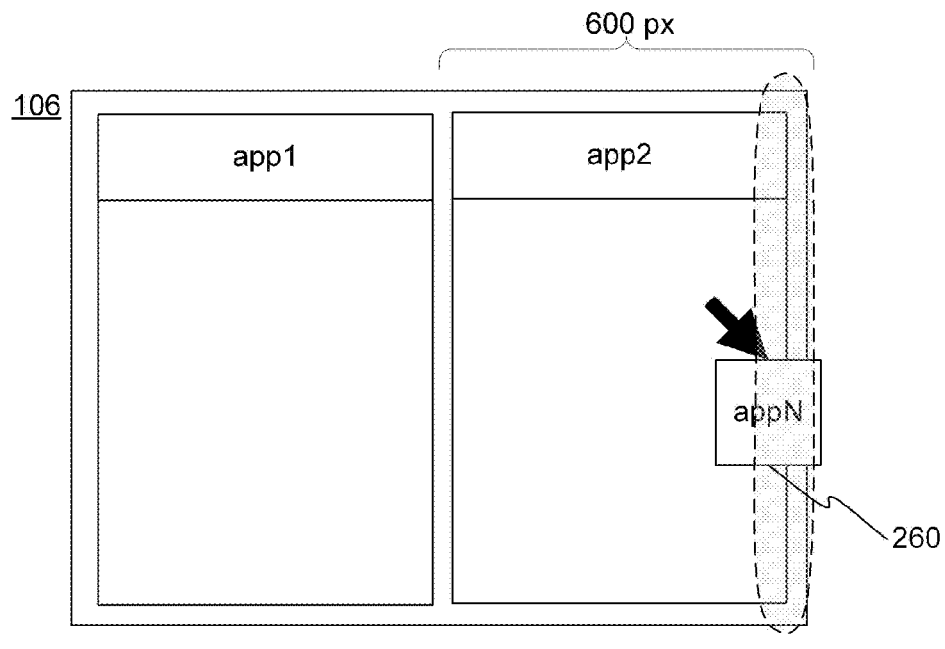
FIG. 7 shows an example of an insertion directed to an edge when a split of the adjacent application is not possible.
Figure 7:
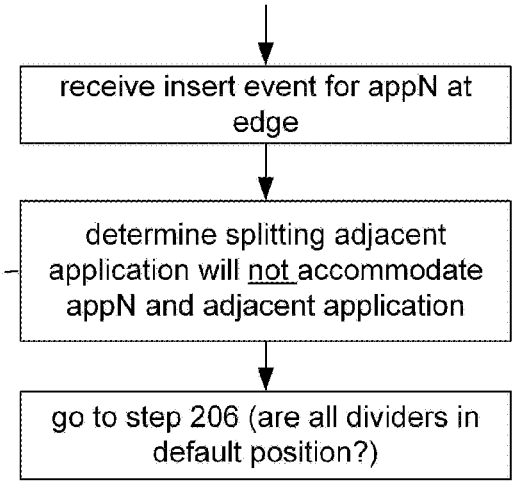

FIG. 7 shows an example of an insertion directed to an edge when a split of the adjacent application is not possible. The insertion event for "appN" is received and there is a determination according to application size information 270 and the size of the adjacent space (600 pixels) a split is not to be performed. While approximately 600 pixels are available and the "app2" window's minimum size of 300 pixels would fit in half of the space. However, the 400 pixel minimum width of the "appN" window would not fit in a 50/50 split. Consequently, step 206 is performed to determine how to insert the application window for "appN".

Figure 8:
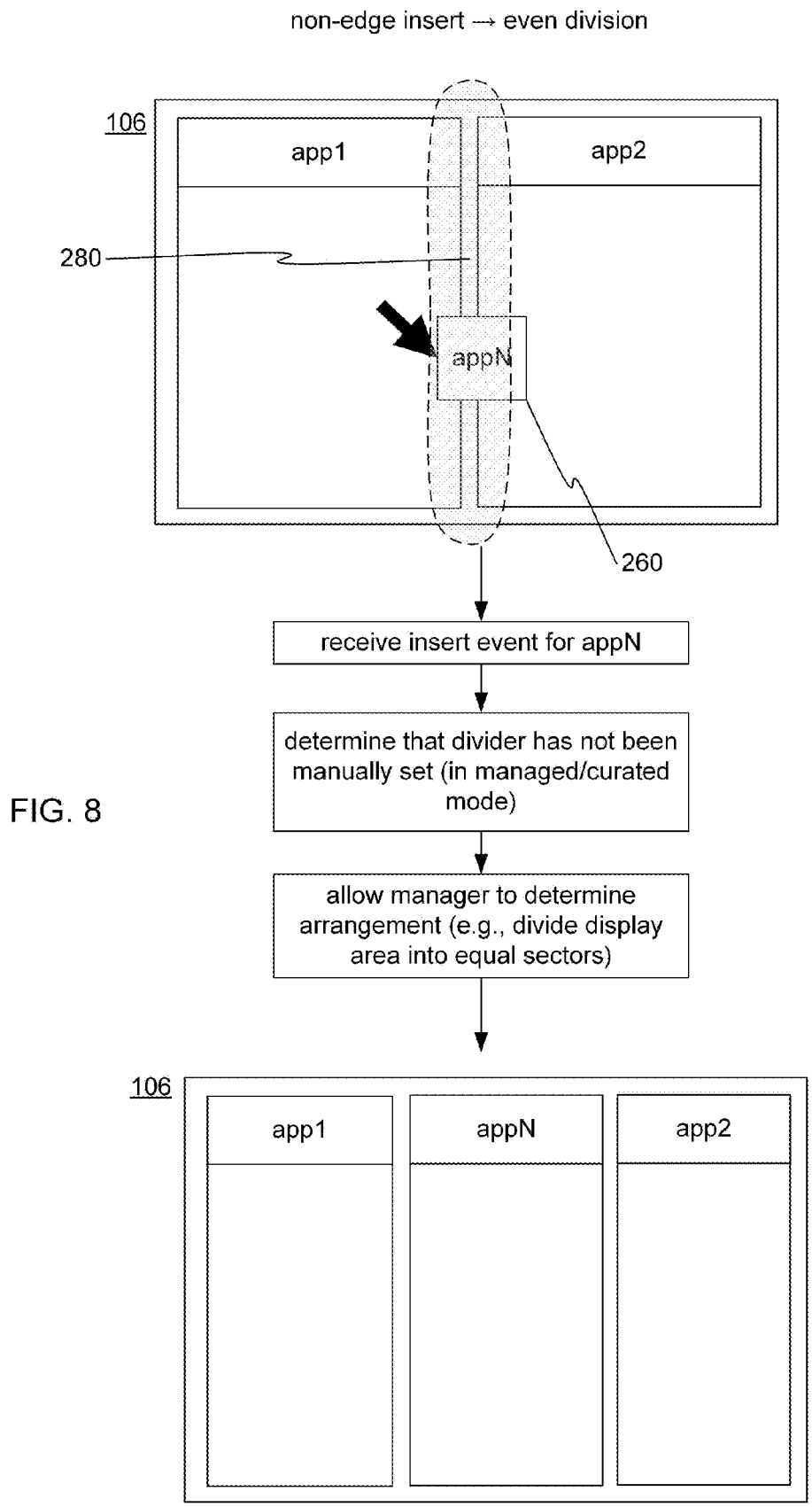
FIG. 8 shows an example of an insertion at a divider or other interior point.

FIG. 8 shows an example of an insertion at a divider or other interior point 280. In this case, when the target application is inserted by the user at a divider or an insertion region that is not an edge, if the divider or default layout has not been altered by the user then the layout manager determines how to arrange the application windows. In this curated or fully-managed mode the layout is arranged by equally distributing display space between the newly displayed target application window and the previously displayed application windows. In practice the distribution may not be precisely equal due to rounding, borders, margins, dividers, etc.

Figure 9:
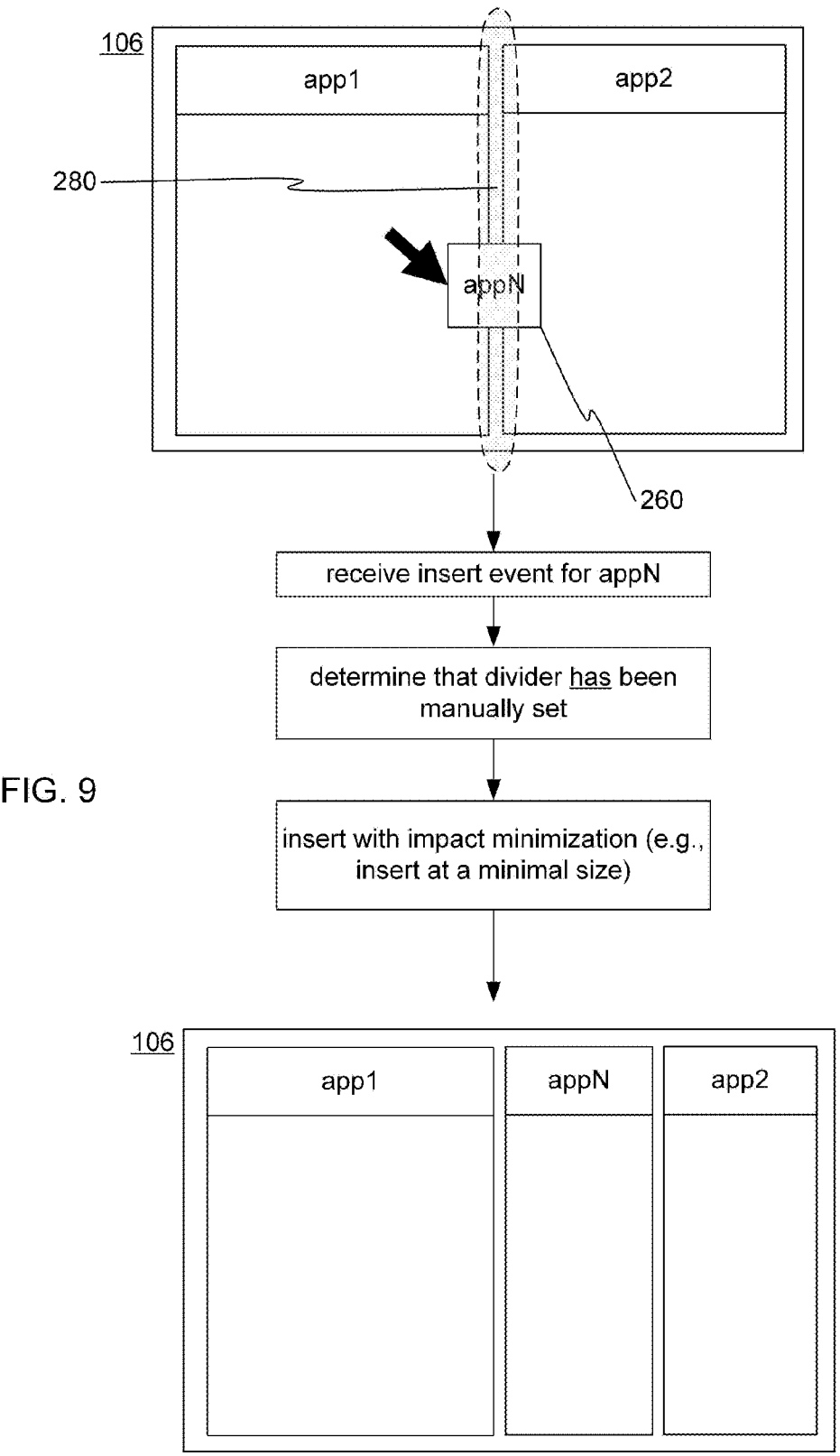
FIG. 9 shows an example inserting a target application window at a divider or interior point that has been manually adjusted.

FIG. 9 shows an example inserting a target application window at a divider or interior point 280 that has been manually adjusted. In this case, when it is determined that the insertion point maps to an interior area or a divider and it is also determined that the divider or default managed layout has not been altered, then a tiled arrangement is computed to minimize impact on the user preference implicit in the detected manual adjustment. For example, inserting the target application window at its minimum size, reducing the pre-existing applications to preserve the ratio between the pre-existing application windows (e.g., "app1" and "app2"), or other approaches may be used. Note that minimal sizes or other features of the windows may be used to inform the impact-minimizing redistribution of space on the display 106.

Target application windows or the need to insert same may originate from a variety of sources. For example, a target window may be a newly launched application. A target window may be a result of interaction with a user interface element for tracking active or launchable applications, for instance selecting an application icon or dragging an application thumbnail into the managed area. A keypress or other input for launching or switching-to an application can also result in a target window to be interactively inserted. It may be appreciated that target application windows being interactively inserted are application windows that are not currently displayed on the display or the managed region thereof.

Some embodiments may repeatedly compute and preview a new tiled arrangement that would occur if a target were placed according to a current input location. In other words, as a user provides locational input such as touch or mouse input points the windowing system may use recent input points as potential insertion points and compute how the displayed and target windows would be tiled if the recent input points were used as the insertion points. Thus the user may be able to customize the insertion and tiling process. Such previews may be simple graphics such as highlights of regions to be affected by a potential insertion, highlights to indicate expected sizes of windows. It is also possible that such input points can be displayed as actual insertions (changing according to changing input points) that are then finalized or undone according to additional user input or ending the current user input. It may be appreciated that the tiled application windows displayed on the display or the managed display region are live or executing application windows susceptible to user input and each able to dynamically display content as the case may be. While horizontal tiling schemes have been described vertical schemes or vertical and horizontal schemes (and corresponding insertion regions) are equally applicable.

Figure 10:
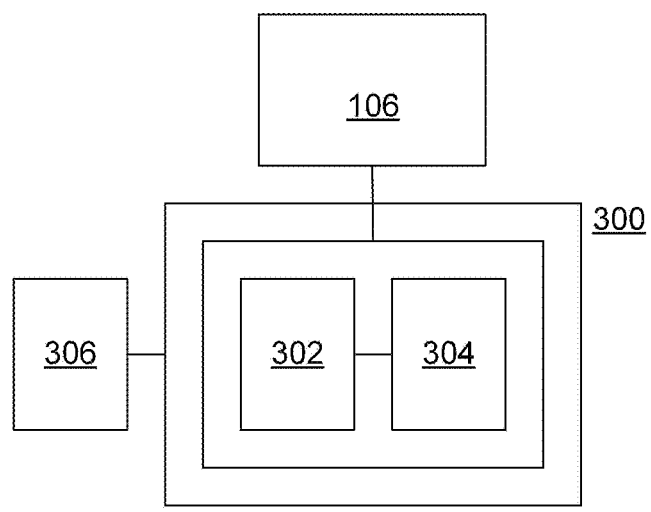
FIG. 10 shows an example of a computing device on which embodiments described herein may be implemented.

FIG. 10 shows an example of a computing device 300 on which embodiments described above may be implemented. The computing device 300 may have the display 106, as well as storage 302 and a processor 304. These elements may cooperate in ways well understood in the art of computing. In addition, input devices 306 may be integrated with or in communication with the computing device 300. The display 106 may be a touch-sensitive display that also functions as an input device. The computing device 300 may have any form factor or be used in any type of encompassing device. For example, touch-sensitive control panels are often used to control appliances, robots, and other machines. The computing device 300 may be in the form of a handheld device such as a smartphone, a tablet computer, a gaming device, a server, or others.

Embodiments and features discussed above can be realized in the form of information stored in volatile or non-volatile computer or device readable devices. This is deemed to include at least devices such as optical storage (e.g., compact-disk read-only memory (CD-ROM)), magnetic media, flash read-only memory (ROM), or devices for storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile devices storing information that allows a program or executable to be loaded and executed. The embodiments and features can be performed on any type of computing device, including portable devices, workstations, servers, mobile wireless devices, and so on.

The invention claimed is:

1. A method of managing display of windows of respective mutually autonomous applications executing on a computer comprising a display, a processor, an input device, and storage, each application comprising a respective process managed by an operating system of the computer, the method comprising:

displaying a plurality of windows on the display, each window separately managed by a windowing system that manages windows for the applications;

receiving interactive user inputs directed to a managed region of the display, the user inputs comprising respective locations in the managed region for insertions of the windows to user-designated locations within the managed region of the display; and each time one of the interactive inputs is received to place an insertion of a corresponding target window having a minimum size when two or more of the windows, excluding the target window, are currently displayed in a tiled arrangement in the managed region, responding to the interactive input to insert the target window into the managed region by:

automatically resizing either or both of the two or more windows that are currently displayed in the region, wherein a target amount for sizing the target window in the managed region and for desizing the two or more windows in the managed region is computed by:

determining whether, just prior to inserting the target window, either of the two or more windows has a size that differs from a default size thereof, selecting a first automatic arrangement calculation when determined that neither of the two or more windows has a size that differs from a default size thereof, and selecting a second automatic arrangement calculation when determined that either of the two or more windows has a size that differs from a default size thereof, automatically determining a target size amount for sizing the target window and for desizing the two or more windows according to the selected arrangement calculation, wherein when the first automatic arrangement calculation is selected the target size amount is automatically set thereby to the minimum size, and when the second automatic arrangement calculation is selected the target size amount is automatically set thereby to be greater than the minimum size; and displaying the target window in the managed region and the two or more windows by sizing the target window to the target size amount and desizing the two or more windows by the target size amount according to the determined target size amount, the windows displayed such that the target window and the two or more windows are displayed in a tiled arrangement in the managed region.

2. A method according to claim 1, further comprising displaying a graphic indicator that is displayed as moving in correspondence with user interaction with an input device, locations of the graphic indicator corresponding to the input-specified locations, and wherein a drop location of the graphic indicator controls apportionment of the desizing amount the two or more windows.

3. A method according to claim 2, wherein the graphic indicator comprises an icon or thumbnail corresponding to the target application window or the graphic indicator comprises the target application window itself.

4. A method according to claim 1, further comprising accessing size information comprising minimum or preferred sizes of the applications and using the minimum or preferred sizes to perform the resizing.

5. A method according to claim 1, further comprising providing a user-adjustable divider between the two currently displayed windows and computing the target size amount according to the position of the user-adjustable divider.

6. A method according to claim 1, wherein when the target window is being inserted the method first determines whether a corresponding insertion location is at an edge of the managed region and when so determined the method determines whether a space occupied by an edge window that is adjacent to the edge can accommodate the edge window and the target window without changing the size of any other displayed windows, and when so determined splitting the space into two parts to which the target window and edge window are respectively fitted, the target window being displayed in the part that is next to the edge.

7. A method according to claim 6, further comprising: when determined that the space cannot accommodate resizing, according to whether a manual adjustment to a window size has been made and/or according to minimum window sizes, resizing the two or more currently displayed windows to accommodate insertion of the target window next to the edge.

8. Storage hardware storing information to enable a computing device to perform a process, the process comprising:
    managing a display region of a display of the computing device, the managing comprising responding to an insertion of a target window into the display region according to an insertion location or insertion region within the display area that was designated by a user input inputted within the display region at the insertion location or insertion region within the display region:
    (i) windows, including the target window, displayed in the display region are automatically maintained in a tiled arrangement within the display region and the size of the display region does not change when windows are inserted thereto and removed therefrom,
    (ii) a determination is automatically made whether sizes of current windows displayed were set manually, the current windows being windows displayed just prior to inserting the target window, the windows comprising respective application processes being executed by an operating system of the computing device, and
    (iii) inserting the target window into the display region comprises tiling the windows in the display region by computing a target amount, wherein the current windows are collectively desized in the display region by the target amount and the target window is sized in the display region to the target amount, wherein at least two current windows are desized, wherein the outcome of the determination controls the target amount, and wherein apportionment of the amount of the desizing among the current windows is determined based on the insertion region or location.

9. Storage hardware according to claim 8, wherein the desizing comprises either (i) splitting a window adjacent to an edge designated for inserting the target window or (ii) displaying the currently displayed windows and the target window with substantially equal sizes.

10. Storage hardware according to claim 9, wherein when determined that the windows have been manually arranged displaying the target window with a pre-determined minimum size thereby minimizing resizing of the windows displayed in the display region before the target window is inserted.

11. Storage hardware according to claim 8, wherein inserting further comprises dividing the display region substantially evenly among all of the windows of respective applications that are displayed in the display region.

12. Storage hardware according to claim 11, wherein the process further comprises determining where to display the target window in the display region according to the insertion location or insertion region.

13. Storage hardware according to claim 12, the process further comprising: when determined that splitting space of only a single window next to an edge designated for insertion is not possible according to minimum window sizes, resizing multiple windows to accommodate the target window.

14. A computing device comprising storage, a processor, a display, and an input device, the device comprising:
    the storage storing instructions executable by the processor;
    the input device providing, according to user interaction therewith, user inputs that actuate window insertions on the display, each window insertion having a respective insertion location relative to the display;
    the processor, according to the instructions, maintaining a tiled arrangement of all application windows displayed by the display; and
    the processor, according to the instructions, responding to a window insertion for inserting a target window into the tiled arrangement by:
        determining whether the tiled arrangement has been manually adjusted by the user or instead corresponds to a default arrangement by comparing a default feature of the tiled arrangement with a corresponding feature of the tiled arrangement,
        when determined that the tiled arrangement has been manually adjusted by the user, allocating display space to the target window and windows displayed before the window insertion using a first arrangement algorithm that computes a first reduced size for one or more of the windows displayed before the window insertion, and
        when determined that the tiled arrangement corresponds to a default arrangement, allocating display space to the target window and windows displayed before the window insertion using a second arrangement algorithm that computes a second reduced size for one or more of the windows displayed before the window insertion, wherein the display space is allocated substantially among the windows according to a predefined ratio when the target windows is not inserted at an edge and the display space is split from an edge window when the target window is inserted at an edge, wherein after the target window is inserted the windows displayed by the display are in a tiled arrangement.

15. A computing device according to claim 14, the processor further determining how to allocate display space according to application preferences of the windows.

16. A computing device according to claim 14, wherein the display space is also split from a window other than the edge window as determined according to window size preferences.

17. A computing device according to claim 14, wherein the processor is configured to detect a user-override input that overrides the target window placement and/or size when being inserted.

* * * * *